United States Patent
Sabo et al.

(10) Patent No.: US 7,798,850 B2
(45) Date of Patent: Sep. 21, 2010

(54) CABLE ASSEMBLY HAVING ENHANCED INTERCONNECTION MEANS THEREOF

(75) Inventors: James M. Sabo, Harrisburg, PA (US); Pei Tsao, La Harbra, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 129 days.

(21) Appl. No.: 12/313,224

(22) Filed: Nov. 18, 2008

(65) Prior Publication Data

US 2010/0124845 A1   May 20, 2010

(51) Int. Cl.
*H01R 13/648* (2006.01)
(52) U.S. Cl. ............................. 439/607.01
(58) Field of Classification Search ......... 439/607.01, 439/607.41, 607.42, 607.44, 607.45, 676, 439/98, 108, 578
See application file for complete search history.

(56) References Cited

U.S. PATENT DOCUMENTS

| | | | |
|---|---|---|---|
| 5,052,947 A * | 10/1991 | Brodie et al. | 439/607.01 |
| 5,515,466 A * | 5/1996 | Lee | 385/78 |
| 5,638,474 A * | 6/1997 | Lampert et al. | 385/78 |
| 6,588,938 B1 * | 7/2003 | Lampert et al. | 385/58 |
| 7,021,971 B2 | 4/2006 | Chou et al. | |
| 7,104,848 B1 | 9/2006 | Chou et al. | |
| 7,380,991 B2 | 6/2008 | Schempp | |
| 7,462,071 B1 * | 12/2008 | Wu | 439/607.05 |
| 7,534,143 B1 * | 5/2009 | Tsao et al. | 439/607.41 |
| 7,717,733 B1 * | 5/2010 | Yi et al. | 439/452 |
| 2004/0115988 A1 * | 6/2004 | Wu | 439/497 |
| 2006/0211305 A1 * | 9/2006 | Scott | 439/607 |
| 2009/0011639 A1 * | 1/2009 | Ballard et al. | 439/607 |

* cited by examiner

*Primary Examiner*—Alexander Gilman
(74) *Attorney, Agent, or Firm*—Wei Te Chung; Andrew C. Cheng; Ming Chieh Chang

(57) ABSTRACT

A cable assembly (1) includes an insulative housing (11) having a base portion (110) and a tongue portion (112) extending forwardly from the base portion, a plurality of contacts mounted to the insulated housing; a metal shell (13) having a tube-shaped mating frame (1311) enclosing the tongue portion therein, and at least a cleat member (1314) formed on a rear portion of the mating frame; and a cable including a number of wires and strength member (222) therein, said wires respectively connected to the contacts, and said strength member wrapped around the cleat member and sandwiched between the base portion of the insulative housing and the cleat member.

20 Claims, 5 Drawing Sheets

CABLE ASSEMBLY HAVING ENHANCED INTERCONNECTION MEANS THEREOF

CROSS-REFERENCE TO RELATED APPLICATIONS

This application is related to U.S. patent application Ser. No. 11/818,100, filed on Jun. 13, 2007 and entitled "EXTENSION TO UNIVERSAL SERIAL BUS CONNECTOR WITH IMPROVED CONTACT ARRANGEMENT", and U.S. patent application Ser. No. 11/982,660, filed on Nov. 2, 2007 and entitled "EXTENSION TO ELECTRICAL CONNECTOR WITH IMPROVED CONTACT ARRANGEMENT AND METHOD OF ASSEMBLING THE SAME", both of which have the same assignee as the present invention.

BACKGROUND OF THE INVENTION

1. Field of the Invention

The present invention relates to a cable assembly, more particularly to a cable assembly with an enhanced interconnection means arranged between an electrical connector and a cable thereof to reinforce physical or mechanical connecting therebetween.

2. Description of Related Art

Recently, personal computers (PC) are used of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), an industry standard body incorporating leading companies from the computer and electronic industries. USB can connect peripherals such as mouse devices, keyboards, PDAs, gamepads and joysticks, scanners, digital cameras, printers, external storage, networking components, etc. For many devices such as scanners and digital cameras, USB has become the standard connection method.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. Due to its clumsiness, SATA is more useful for internal storage expansion than for external peripherals.

The existing USB connectors have a small size but low transmission rate, while other non-USB connectors (PCI Express, SATA, et al) have a high transmission rate but large size. Neither of them is desirable to implement modern high-speed, miniaturized electronic devices and peripherals. To provide a kind of connector with a small size and a high transmission rate for portability and high data transmitting efficiency is much desirable.

In recent years, more and more electronic devices are adopted for optical transmitter. It may be good idea to design a connector which is capable of transmitting an electrical signal and an optical signal. Someone has begun to conceive such kind of connector which is compatible of electrical and optical signals transmitting. The connector includes metallic contacts assembled to an insulated housing and several optical lenses bundled together and mounted to the housing too. A kind of hybrid cable includes wires and optical fibers are respectively attached to the metallic contacts and the optical lenses.

However, the optical fibers are too delicate to be damaged, and reliable physical and mechanical interconnection between the connector and the cable is desired.

BRIEF SUMMARY OF THE INVENTION

Accordingly, an object of the present invention is to provide a cable assembly which has an enhanced interconnection means between wires and a connector.

In order to achieve the above-mentioned object, a cable assembly in accordance with present invention comprises an insulative housing having a base portion and a tongue portion extending forwardly from the base portion, said tongue portion defining a top surface and a bottom surface opposite to the top surface; a plurality of contacts mounted to the insulated housing, each contact having a mating portion arranged proximate to one of the top or bottom surface of the tongue portion, and a tail portion extending beyond a back surface of the base portion; a metal shell having a tube-shaped mating frame enclosing the tongue portion therein, and at least a cleat member formed on a rear portion of the mating frame; and a cable including a number of wires and a strength member therein, said wires respectively connected to the contacts, and said strength member wrapped around the cleat member and sandwiched between the base portion of the insulative housing and the cleat member.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
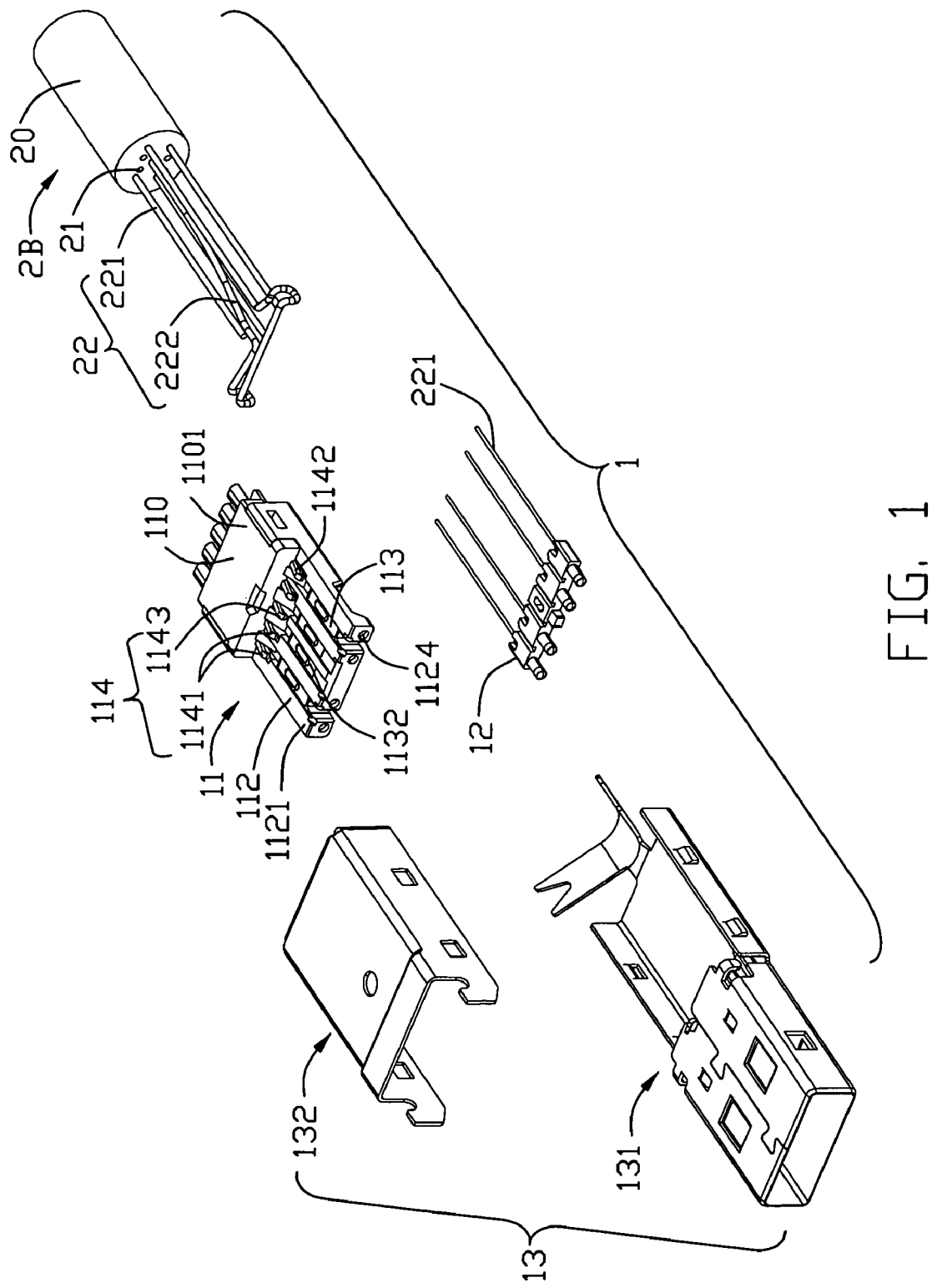
FIG. 1 is an exploded, perspective view of a cable assembly in accordance with the first embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 2:
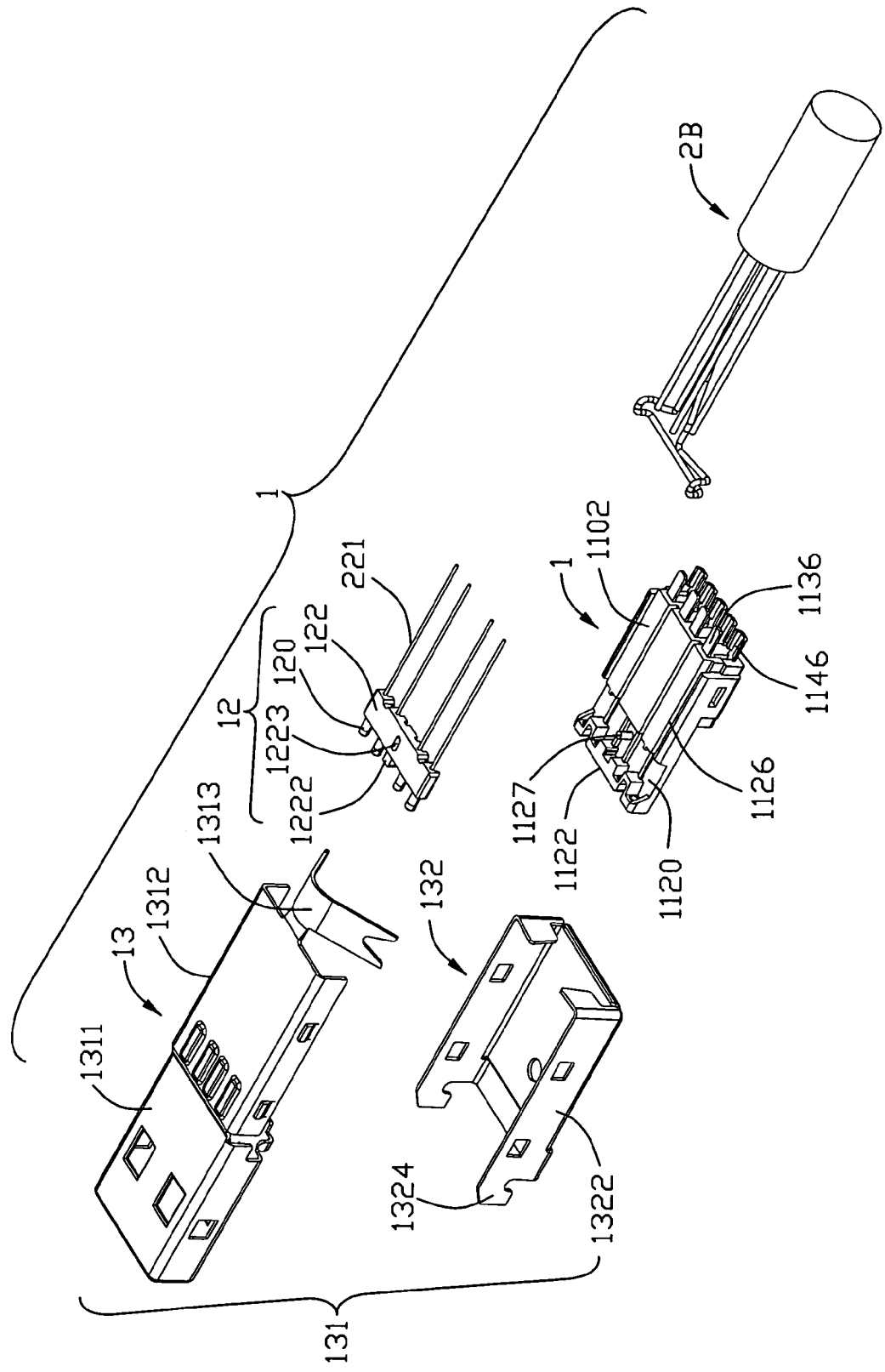
FIG. 2 is a view similar to FIG. 1, but viewed from a different aspect.
Figure 3:
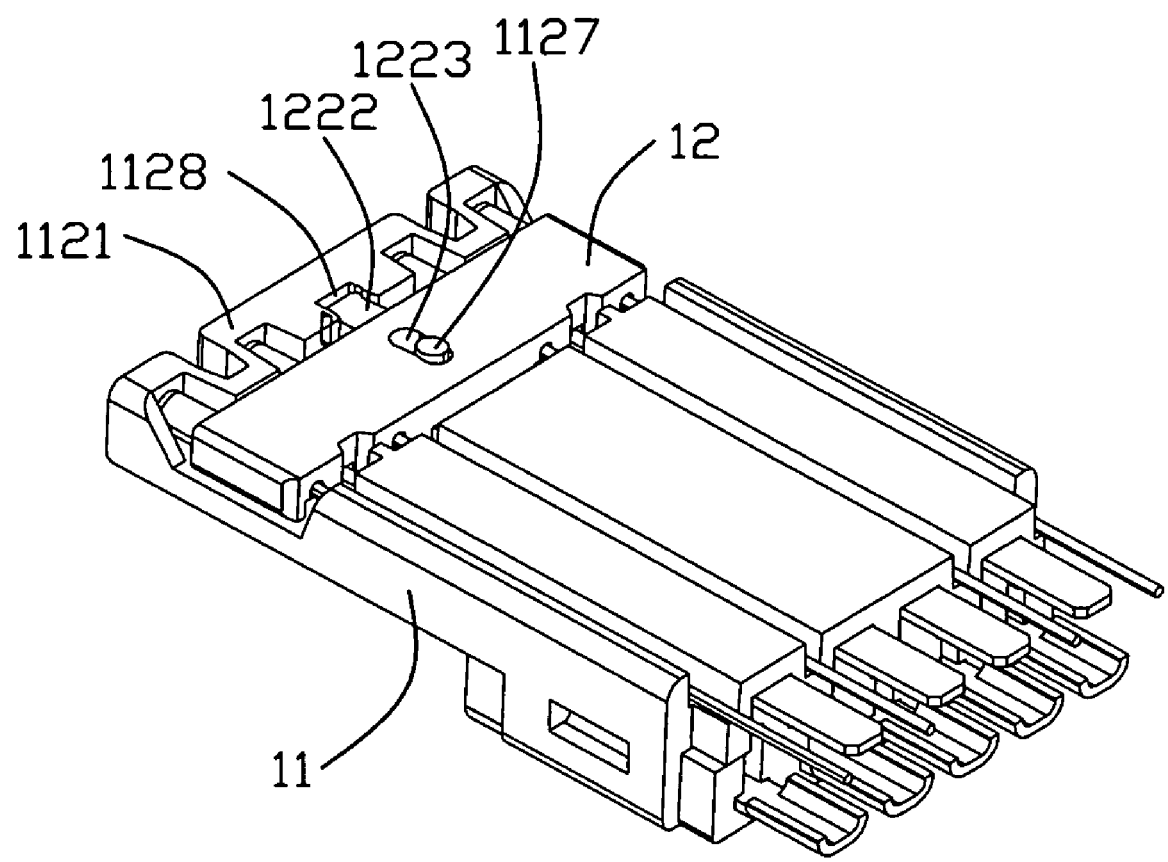
FIG. 3 is a partially assembled view of the cable assembly.
Figure 4:
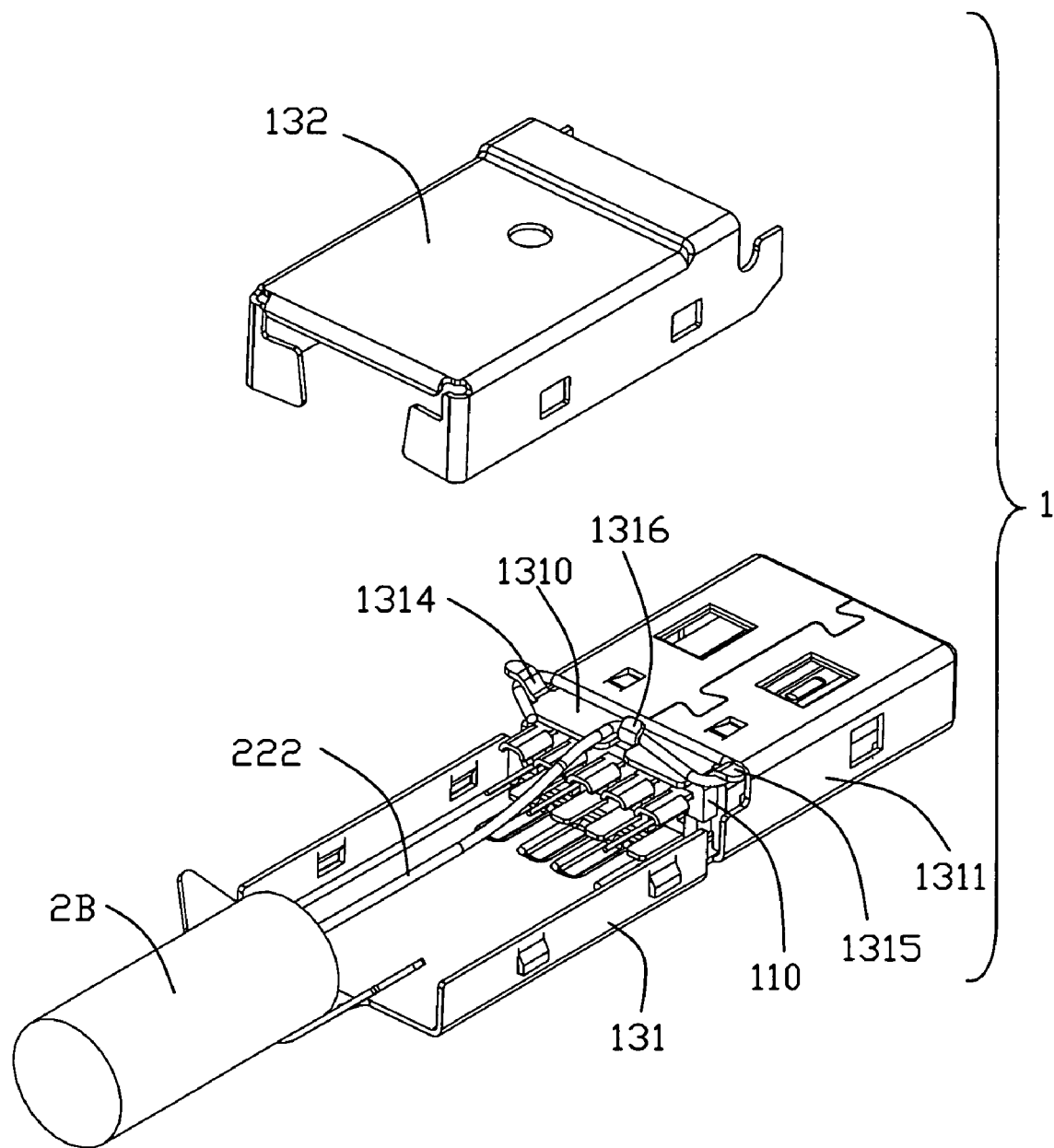
FIG. 4 illustrates partial of strength member wrapped around cleat members formed on a shell of a connector.
Figure 5:
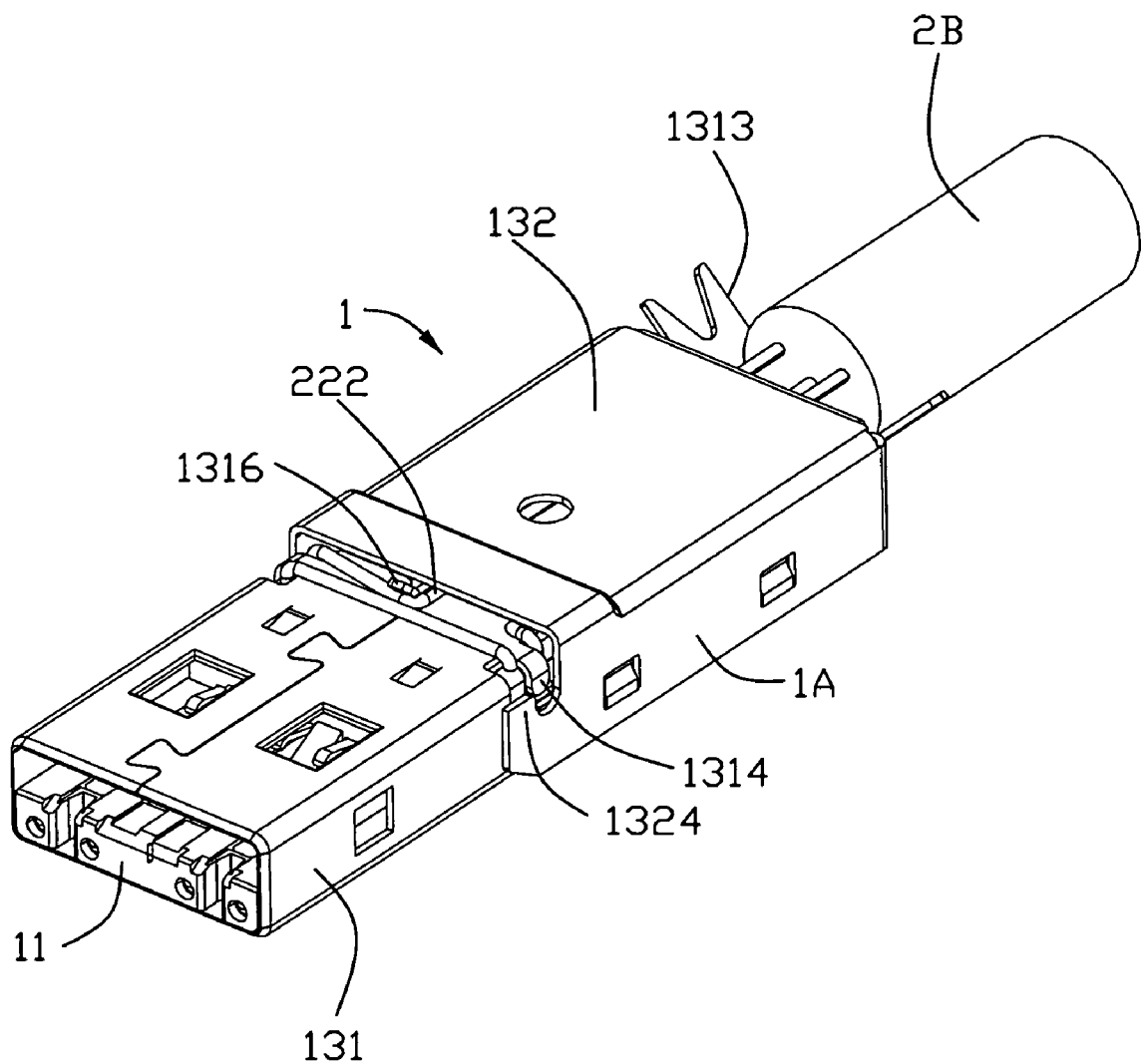
FIG. 5 is an assembled, perspective view of the cable assembly.

Referring to FIGS. 1-5, a cable assembly 1 according to a preferred embodiment of the present invention includes a connector 1A and a cable 2B connected to the connector 1A. Detail description of these elements and their relationship and other elements formed thereon will be detailed below.

The connector 1A comprises an insulative housing 11 which has an insulative base portion 110 and an insulative tongue portion 112 extending forwardly from a lower portion of a front edge of the insulative base portion 110, a set of first contacts 113 and a set of second contacts 114 supported by the insulative housing 11, an optical module 12 accommodated in a cavity 1120 defined in a lower section of the tongue portion 12.

The base portion 110 has a top surface 1101 which is higher than a top surface 1121 of the tongue portion 112 along a vertical direction; the base portion 110 further has a bottom surface 1102 is arranged same level as a bottom surface 1122 of the tongue portion 112. The cavity 1120 is recessed upwardly from a front section of the bottom surface 1122 of the tongue portion 112, with a front wall 1121 located in front of the cavity 1120. Four passages 1124 are recessed backward from a front surface of the front wall 1121 and in communication to the cavity 1120, and four slots 1126 are recessed downwardly from a back section of the bottom surface 1122 of the tongue portion 11 and the bottom surface 1102 of the base portion 110 and further communicate with the cavity 1120. The slots 1126 respectively align with the passages 1124 along a longitudinal direction.

Each of the first contacts 113 includes a planar mating portion 1132 located on and supported by a front section of the top surface 1121 of the tongue portion 112, a planar tail portion 1136 extending beyond a back surface of the base portion 110, and a retention portion (not shown) received in the base portion 110 and connecting the mating portion 1132 and the tail portion 1136.

The second set of second contacts 114 include two pairs of differential contacts 1141 arranged lateral sides for transmitting signals and a grounding contact 1143 located between the two pairs of differential contacts 1141 for preventing cross-talk. Each second contact 114 comprises a curved mating portion 1142 located above a back section of the top surface 1121, a nest shaped (groove shaped) tail portion 1146 extending beyond the back surface of the base portion 110 and disposed higher than the tail portion 1136 of the first contact 113, and a retention portion (not shown) received in the base portion 110 and connected to the mating portion 1142 and the tail portion 1146.

The optical module 12 includes a holder member 122, four lenses 120 enclosed within the holder member 122 and further projected outside from a front surface of the holder member 122. The optical module 12 is accommodated in the cavity 1120, with the lenses 120 projected into the passages 1124. A positioning post 1127 is formed on a bottom surface of the cavity 1120 and inserted into an aperture 1123 located in a middle section of the holder member 122, and a protrusion member 1222 extends into a recess 1128 defined in a back portion of the vertical wall 1122.

The cable 2B comprises a number of copper wires 21 for transmitting electrical signals and optical wires 22 for transmitting optical signals, and an insulative jacket 20 enclosing peripheral of the signal wires 21 and the optical wires 22. Each optical wire 22 includes corresponding optical fiber 221 and associated strength member 222 for increasing strength of the cable 2B or a tolerance the optical wire 22, such that the delicate optical fiber 123 will not be damaged. The strength member 222 may be kevlar members, fiberglass, etc. The copper wires 21 are respectively connected to the tail portions 1136, 1146 of the first and second contacts 113, 114, and the optical fibers 221 are coupled to the lenses 120.

The cable assembly 1 further comprises a metal shell 13. The metal shell 13 comprises a lower first part 131 and an upper second part 132 engaging with the first half part 131. The first part 131 comprises a front tube-shaped mating frame 1311, a rear U-shaped body section 1312 connected to a bottom side and lateral sides of the mating frame 1311, and a cable holder member 1313 attached to a bottom side of the body section 1312. A first cleat member 1314 and a second cleat member 1315 extend laterally from a rear section of a top side 1310 of the mating frame 1311, and a tab 1316 is formed at a rear edge of the top side 1310 and located between the first and second cleat members 1314, 1315. The second part 132 comprises an inverted U-shaped body section 1322 and two locking members 1324 extending forwardly from lateral walls of the body portion 1322.

When assembly, partial of the insulative jacket of a front segment of the cable 2B is stripped to have the copper wires 21 and optical wires 22 exposed outside, then the copper wires 21 are soldered to the first, second contacts 113, 114, and the optical fibers 221 pass through the slots 1126 of the insualtive housing 11 and coupled to the lenses 120. Secondly, the insulative housing 11 is inserted into the mating frame 1311. Thirdly, the strength member 222 is tautened and wrapped around the tab 1316, the second cleat member 1315, and the first cleat 1314 sequentially, then the first and the second cleat members 1314, 1315 are bent downwardly and inwardly to press against the strength member 222, thus the strength member 222 is clipped/sandwiched between the base portion 110 and the first and second cleat members 1314, 1315. However, it should be noticed that the strength member 222 may be directly sandwiched between the first and second cleat members 1314, 1315 and the top side 1310 of the mating frame 1311. The second part 132 is assembled to the U-shaped body section 1312 of the second part 131 to have partial of the strength member 222 sandwiched therebetween. The tab 1316 is arranged between a front edge of a top side of the second part and a geometric plane (not numbered) which is located adjacent to front edges of the cleat members 1314, 1315 and orthogonal to the cleat members 1314, 1315. The tab 1316 is utilized for adjusting an extending direction of the strength member 222 disposed between the cable 2B and the metal shell 13. In another alternative embodiment, the strength member 222 may directly tautened and wrapped around the tab 1316, and then the tab 1316 is bent toward the top side 1310 of the mating frame 1311 to sandwiched the Strength member 222 therebetween. Therefore, the strength member 222 is securely attached to the first half part 131 of the metal shell 13. The two locking members 1324 engage with the first and second cleat members 1314, 1315. The cable holder member 1313 is crimped to the insulative jacket 20 of the cable 2B.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

We claim:

1. A cable assembly, comprising:
    an insulative housing having a base portion and a tongue portion extending forwardly from the base portion, said tongue portion defining a top surface and a bottom surface opposite to the top surface;
    a plurality of contacts mounted to the insulated housing, each contact having a mating portion arranged proximate to one of the top or bottom surface of the tongue portion, and a tail portion extending beyond a back surface of the base portion;
    a metal shell having a tube-shaped mating frame enclosing the tongue portion therein, and at least a cleat member formed on a rear portion of the mating frame; and
    a cable including a number of wires and a strength member therein, said wires respectively connected to the contacts, and said strength member wrapped around the cleat member and sandwiched between the base portion of the insulative housing and the cleat member.

2. The cable assembly as claimed in claim 1, wherein a tab is formed in a middle section of the rear portion of the mating frame and the Strength member is wrapped around the tab.

3. The cable assembly as claimed in claim 2, wherein the cleat member is arranged at one of lateral sides of the rear portion of the mating frame and presses against the strength member.

4. The cable assembly as claimed in claim 3, wherein another cleat member is arranged at the other lateral side of the rear portion of the mating frame and presses against the strength member.

5. The cable assembly as claimed in claim 1, wherein the contacts includes a set of first contacts and a set of second contacts having different contours.

6. The cable assembly as claimed in claim 5, wherein the tail portions of the first contacts are planar shaped, and the tail portions of the second contacts are nest shaped.

7. The cable assembly as claimed in claim 6, wherein the tail portions of the first contacts are vertically spaced apart the tail portions of the second contacts.

8. The cable assembly as claimed in claim 5, wherein the mating portions of the first contacts are planar shaped, and the mating portions of the second contacts are curve shaped.

9. The cable assembly as claimed in claim 8, wherein the mating portions of the first contacts are disposed adjacent to the one surface of the tongue portion, and the mating portions of the second contacts are located above the one surface of the tongue portion.

10. A cable assembly, comprising:
    a connector comprising:
    an insulative housing having a base portion and a tongue portion extending forwardly from the base portion;
    a plurality of contacts supported by the insulated housing;
    a metal shell including a first part and a second part associated together to enclose the insulated housing therebetween, said first part having a tube-shaped mating frame and a substantially U-shaped body section connected to a bottom side and lateral sides of the mating frame, and the second part having an inverted U-shaped body section assembled to the U-shaped body section of the first part;
    at least a cleat member formed on a rear portion of the mating frame; and
    a cable having a number of wires for coupling to the contacts and a strength member arranged inside the cable, and partial of strength member exposed outside, extending into a hollow between the U-shaped body section and the inverted U-shaped body section of the metal shell, and said strength member further sandwiched between the base portion of the insulative housing and the cleat member.

11. The cable assembly as claimed in claim 10, wherein the strength member is sandwiched between a front section of a top side of the second part and the rear section of a top side of the mating frame of the first part of the metal shell.

12. The cable assembly as claimed in claim 11, wherein a cable holder member is attached to a bottom side of the body section of the first part and crimped to a peripheral portion of the cable.

13. The cable assembly as claimed in claim 10, wherein the cleat member is formed at a lateral side of the rear portion of the mating frame, and a corresponding locking member extends forwardly from a lateral side of the second part and engages with the cleat member.

14. The cable assembly as claimed in claim 10, wherein the cleat member laterally projects outwards and is bent toward the base portion of the insulative housing to sandwich the strength member therebetween.

15. The cable assembly as claimed in claim 10, wherein a tab is formed at a middle section of the rear portion of the mating frame, and the strength member is wrapped around the tab.

16. The cable assembly as claimed in claim 15, wherein an additional cleat member is formed at other lateral side of the rear portion of the mating frame.

17. The cable assembly as claimed in claim 16, wherein the tab is arranged between a front edge of a top side of the second part and a geometric plane which is located adjacent to front edges of the cleat members and orthogonal to the cleat members.

18. A cable connector assembly comprising:
    an insulative housing defining opposite first and second faces in a front-to-back direction;
    a plurality of contacts disposed in the housing with contacting sections exposed on the first face;
    a metallic shell surrounding the housing and defining opposite main walls and opposite side walls;

a cleat member formed on a rear portion of the shell; and a cable including a plurality of wires connected to the corresponding contacts, respectively, and further including a wire like strength member grasping the cleat member; wherein said cleat member is further bent to press the strength member in position.

19. The cable connector assembly as claimed in claim 18, wherein the cleat member includes at least two protrusions respectively located at two opposite sides of the shell, both of which the strength member pass.

20. The cable connector assembly as claimed in claim 19, wherein said cleat member further includes a third protrusion located around a centerline, with which said strength member is engaged.

* * * * *